(12) United States Patent
Bellah

(10) Patent No.: US 9,699,946 B2
(45) Date of Patent: Jul. 11, 2017

(54) SHOVEL WITH MEASUREMENT MARKINGS

(71) Applicant: Thomas Julian Bellah, Sanderson, TX (US)

(72) Inventor: Thomas Julian Bellah, Sanderson, TX (US)

(*) Notice: Subject to any disclaimer, the term of this patent is extended or adjusted under 35 U.S.C. 154(b) by 0 days.

(21) Appl. No.: 14/673,182

(22) Filed: Mar. 30, 2015

(65) Prior Publication Data

US 2016/0286710 A1   Oct. 6, 2016

(51) Int. Cl.
*A01B 1/00* (2006.01)
*A01B 1/02* (2006.01)
*G01B 3/28* (2006.01)

(52) U.S. Cl.
CPC . *A01B 1/02* (2013.01); *G01B 3/28* (2013.01)

(58) Field of Classification Search
CPC .. A01B 1/02; A01B 76/00; A01B 1/08; A01B 1/12; A01B 1/14; A01B 1/20; A01B 1/00; A01B 1/22; G01B 3/04; G01B 5/18; E04D 13/106
USPC .............. 294/182, 49–61, 176–181
See application file for complete search history.

(56) References Cited

U.S. PATENT DOCUMENTS

| | | | | |
|---|---|---|---|---|
| 1,299,417 A | * | 4/1919 | Bailey | A01B 1/20 172/375 |
| 1,983,815 A | * | 12/1934 | Schmiett | A01O 5/02 283/115 |
| 5,820,183 A | * | 10/1998 | Marcus | A01B 1/00 294/49 |
| 5,975,601 A | * | 11/1999 | Spear | A01B 1/00 16/DIG. 19 |
| 6,089,632 A | * | 7/2000 | Pickren | E21B 11/005 294/118 |
| 2004/0164570 A1 | * | 8/2004 | Souza, Jr. | A01B 1/02 294/51 |
| 2005/0093316 A1 | * | 5/2005 | O'Rear | B25G 1/12 294/57 |
| 2005/0241839 A1 | * | 11/2005 | Demar | A01B 1/02 172/378 |
| 2008/0054659 A1 | * | 3/2008 | Boxum | A01B 1/02 294/51 |
| 2008/0309106 A1 | * | 12/2008 | Baker | A01B 1/04 294/49 |
| 2011/0080014 A1 | * | 4/2011 | Baker | A01B 1/02 294/51 |
| 2015/0319908 A1 | * | 11/2015 | Kuss | A01B 1/06 172/371 |

FOREIGN PATENT DOCUMENTS

| | | | | |
|---|---|---|---|---|
| DE | 102007018256 B3 | * | 9/2008 | A41H 1/00 |
| JP | EP 2835074 A1 | * | 2/2015 | A45D 24/36 |

* cited by examiner

*Primary Examiner* — Gabriela Puig
(74) *Attorney, Agent, or Firm* — Karl L. Larson

(57) ABSTRACT

A shovel with measurement markings for digging a hole that includes a handle portion, a blade portion, and an elongated shaft portion interconnecting at opposite ends thereof the blade portion and the handle portion. The blade portion includes plurality of uniformly distributed notches arranged substantially along at least one side of the blade portion and configured to indicate the vertical depth of the hole.

10 Claims, 4 Drawing Sheets

SHOVEL WITH MEASUREMENT MARKINGS

BACKGROUND OF THE INVENTION

Field of the Invention

The present invention is generally related to apparatus for digging a hole, and more particularly to shovel with measurement markings for digging a hole.

Discussion of the Background

Shovels known in the prior art are designed for digging a hole, but typically require the use of an additional measurement device such as a ruler in order to measure the depth of the hole. Such a configuration requires a user to periodically measure the depth of the hole using a separate measurement apparatus, thereby increasing the time to dig the hole.

Thus, there currently exist deficiencies in shovel designs.

SUMMARY OF THE INVENTION

Accordingly, one aspect of the present invention is to provide a shovel with measurement markings for digging a hole including a handle portion, a blade portion, and an elongated shaft portion interconnecting at opposite ends thereof the blade portion and the handle portion. The blade portion includes plurality of uniformly distributed notches arranged substantially along at least one side of the blade portion and configured to indicate the vertical depth of the hole.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein.

DETAILED DESCRIPTION THE PREFERRED EMBODIMENTS

Figure 1:
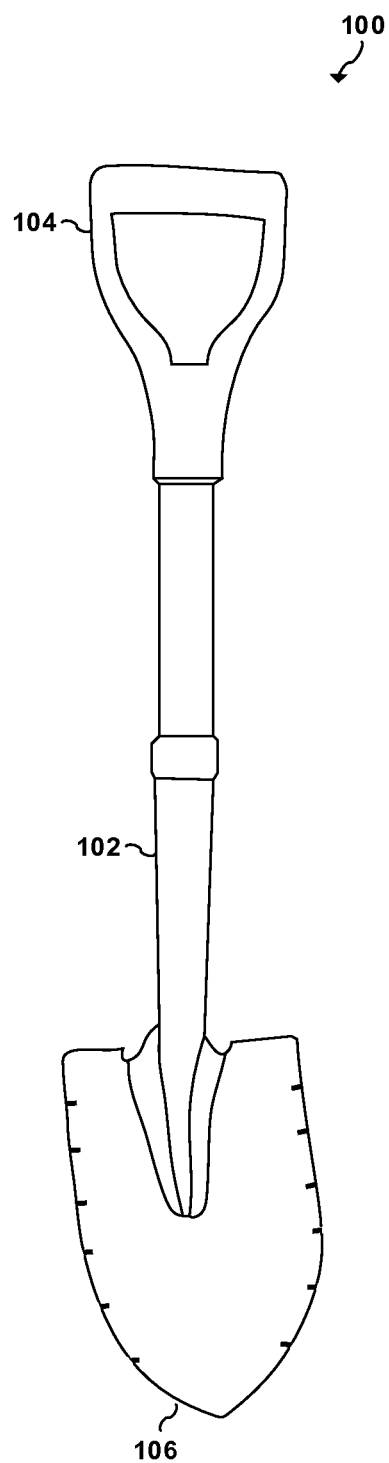
FIG. 1 is a front view of a shovel with measurement markings in accordance with an embodiment of the present invention.

Referring now to the drawings, wherein like reference numerals designate identical or corresponding parts throughout the several views, preferred embodiments of the present invention are described.

Figure 2:
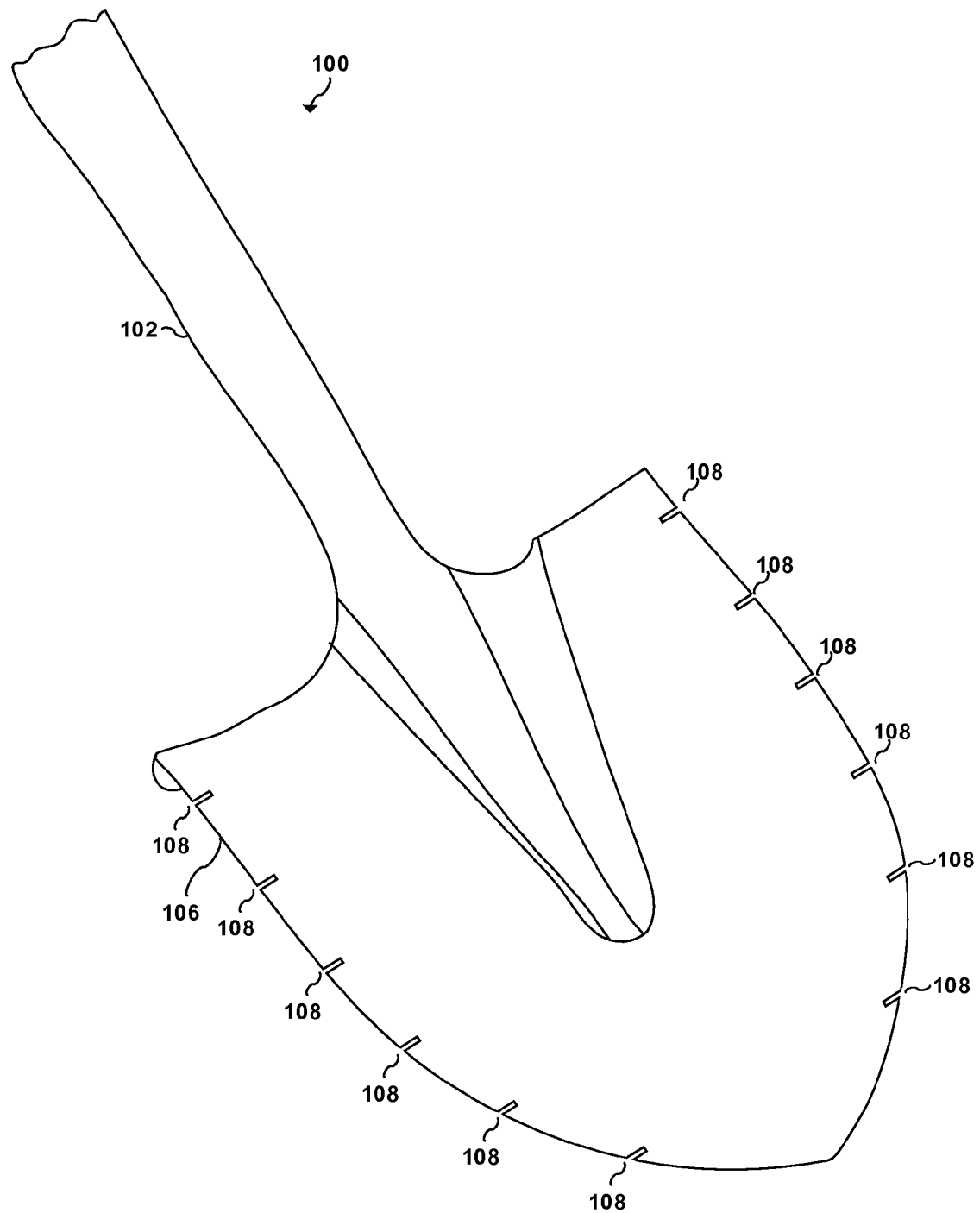
FIG. 2 is an expanded view of the shovel with measurement markings showing the blade portion in accordance with an embodiment of the present invention.

Referring to FIGS. 1-2, a shovel with measurement markings 100 in accordance with an embodiment of the present invention, is shown. According to this non-limiting embodiment, the shovel with measurement markings 100 includes a handle portion 104 and a blade portion 106 interconnected by an elongated shaft portion 102 at opposite ends thereof. The blade portion 106 includes plurality of uniformly distributed notches 108 on one or both sides thereof aligned vertically and configured to indicate the depth of a hole being dug using the shovel with measurement markings 100. The plurality of uniformly distributed notches 108 indicating the depth of the hole may be in any unit of measure including, without limitation, inches, feet, centimeters, meters, and the like. The plurality of uniformly distributed notches 108 may use the same unit of measure on opposite sides of the blade portion 106. The plurality of uniformly distributed notches 108 may also use a single unit of measure only on one side of the blade portion 106. Alternatively, the plurality of uniformly distributed notches 108 may use different units of measure at opposite sides of the blade portion. For instance, without limitation, one side may represent inches and the other side may represent centimeters. Those skilled in landscaping and construction will appreciate will appreciate that a shovel with measurement markings 100 is useful for digging holes that require specific dimensions.

The handle portion 104 and shaft portion 102 may be comprised of, without limitation, metal, wood, composite, plastic, fiberglass, or the like. The blade portion 106 may be comprised of, without limitation, an alloy, metal composite, or the like. The shape of the blade may be curved or flat, so as long as the blade has a solid construction that is capable of digging. The handle portion 104 and shaft portion 102, and the shaft portion 102 and blade portion 106 may be respectively connected to each other, without limitation, by means of screwing, pinning, bolting, welding, or the like.

Figure 3A:
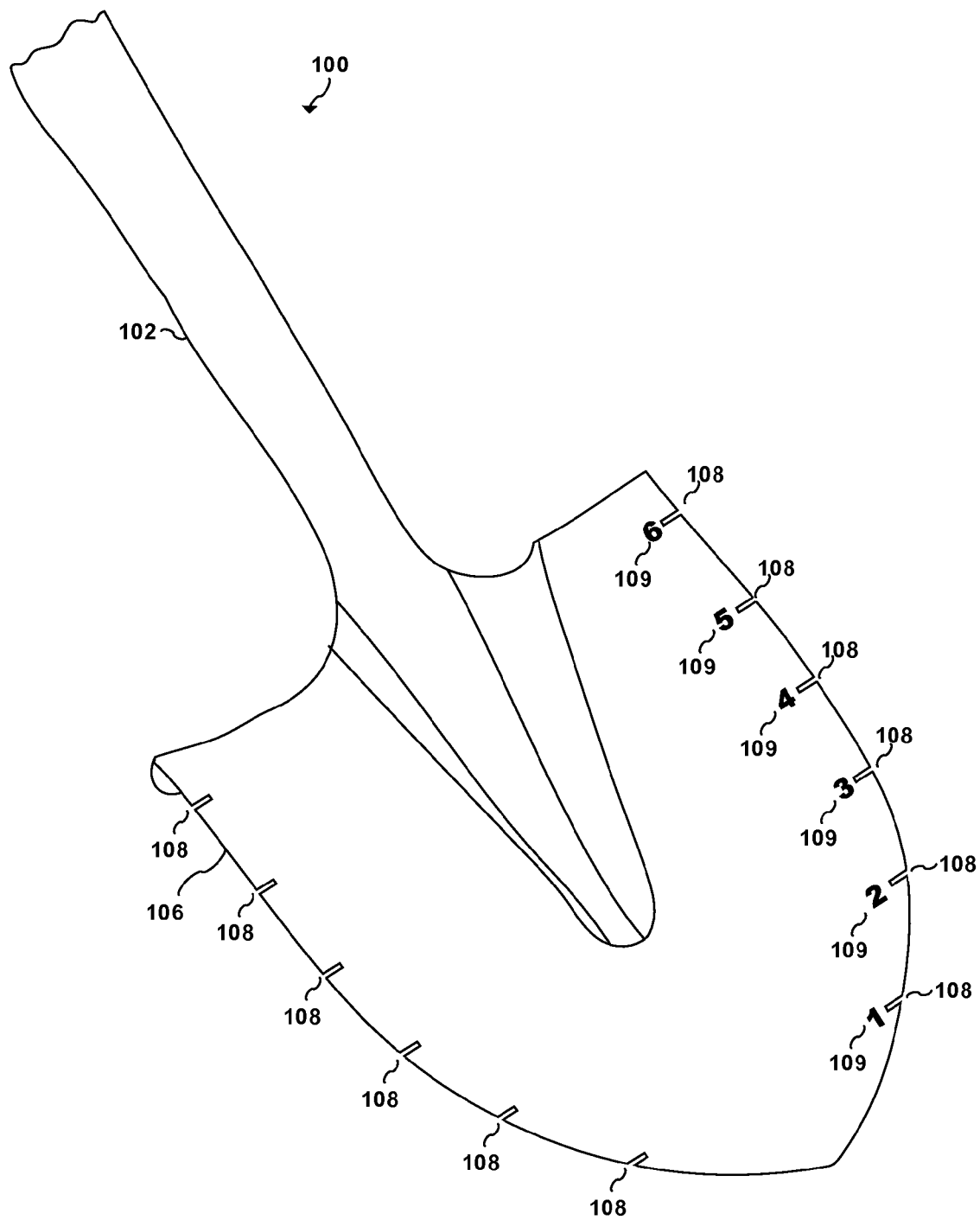
FIGS. 3A-3B are expanded views of the shovel with measurement markings showing the blade portion in accordance with alternate embodiments of the present invention.
Figure 3B:
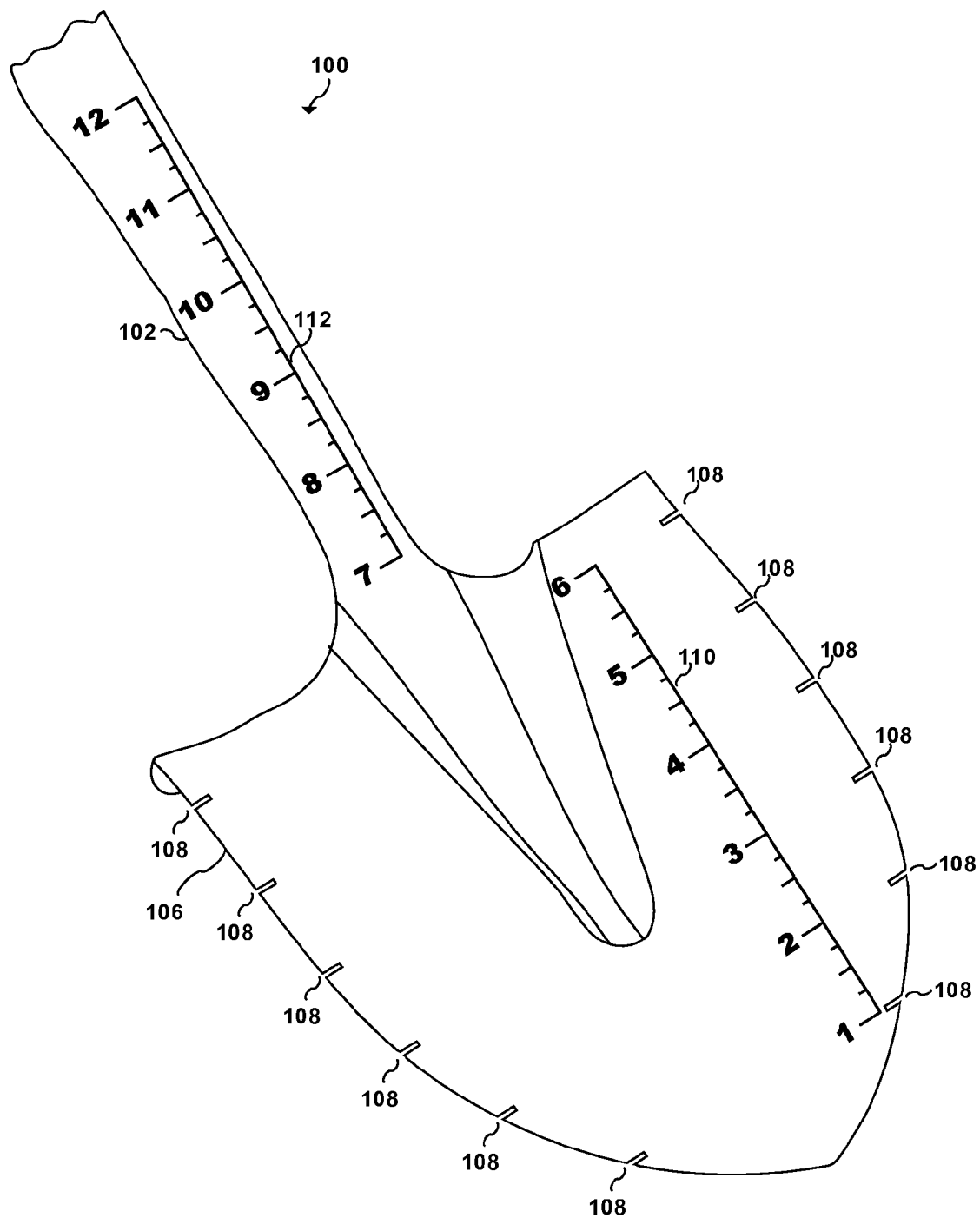

Referring to FIGS. 3A-3B, a shovel with measurement markings 100 in accordance with alternate embodiments of the present invention, is shown. According to these alternate embodiments, the shovel with measurement markings 100 may also include one or more measurement indicia as shown in FIG. 3. According to this alternate embodiment, the blade portion 106 may optionally include marking indicia 109 and/or 110, and the handle portion 104 may optionally include marking indicia 112. However, the present invention envisions using the marking indicia (109, 110 and/or 112) only in combination with the plurality of uniformly distributed notches 108. This is because the use of marking indicia alone is inherently flawed because such marking is often not visible. For instance, the marking indicia may rub off the blade portion through use or may be covered by dirt or mud which obstructs its view. Conversely, use of plurality of uniformly distributed notches 108 is more likely to be visible as an indication of the depth of the hole and cannot rub off over time through use.

It will be apparent to those skilled in the art that various modifications and variations can be made in the individualized health evaluation system and method of the present invention without departing form the spirit or scope of the invention. Thus, it is intended that the present invention cover the modifications and variations of the invention provided they come within the scope of the appended claims and their equivalents.

Obviously, many other modifications and variations of the present invention are possible in light of the above teachings. The specific embodiments discussed herein are merely illustrative, and are not meant to limit the scope of the present invention in any manner. It is therefore to be understood that within the scope of the disclosed concept, the invention may be practiced otherwise then as specifically described.

The invention claimed is:

1. A shovel with uniformly distributed measurement markings for digging a hole comprising:
    a handle portion;
    a blade portion; and
    an elongated shaft portion interconnecting at opposite ends thereof the blade portion and the handle portion, wherein the blade portion includes a pair of substantially inwardly inclined edges intersecting to form a point and plurality of uniformly distributed rectangular measurement notches arranged substantially along the length of at least one of the pair of substantially inwardly inclined edges of the blade portion and configured to measure the vertical depth of the hole.

2. The shovel with measurement markings of claim 1, wherein the plurality of uniformly distributed rectangular notches comprise a first and second set of plurality of uniformly distributed rectangular notches arranged at opposite sides of the blade portion.

3. The shovel with measurement markings of claim 2, wherein the first and second sets of uniformly notches both represent the same first unit of measure.

4. The shovel with measurement markings of claim 3, wherein the first and second unit of measure represents at least one selected from the group consisting of inches, feet, centimeters and meters.

5. The shovel with measurement markings of claim 2, wherein the first set of uniformly distributed rectangular notches represents a first unit of measure and the second set of uniformly distributed rectangular notches represents a second unit of measure.

6. The shovel with measurement markings of claim 5, wherein the first unit of measure represents at least one selected from the group consisting of inches and feet, and the second unit of measure represents at least one selected from the group consisting of centimeters and meters.

7. The shovel with measurement markings of claim 1, wherein the blade portion further includes a plurality of uniformly distributed indicia configured to measure the vertical depth of the hole.

8. The shovel with measurement markings of claim 7, wherein the uniformly distributed indicia comprises a vertical ruler parallel to the plurality of uniformly distributed rectangular notches.

9. The shovel with measurement markings of claim 7, wherein the uniformly distributed indicia comprises a plurality of numbers parallel to the plurality of uniformly distributed rectangular notches.

10. The shovel with measurement markings of claim 1, wherein the elongated shaft portion includes a plurality of uniformly distributed indicia configured to measure the vertical depth of the hole.

* * * * *